US012539072B2

(12) United States Patent
Tonooka et al.

(10) Patent No.: US 12,539,072 B2
(45) Date of Patent: Feb. 3, 2026

(54) BIOLOGICAL INFORMATION DETECTION DEVICE AND BIOLOGICAL INFORMATION DETECTION METHOD

(71) Applicant: Mitsubishi Electric Corporation, Tokyo (JP)

(72) Inventors: Shun Tonooka, Tokyo (JP); Kota Nomura, Tokyo (JP); Kazuki Yamauchi, Tokyo (JP); Tetsuya Matsuda, Tokyo (JP); Takami Tomiyama, Osaka (JP); Tomohiro Umeda, Osaka (JP); Satoshi Seino, Suita (JP); Toshiyasu Sakane, Kobe (JP); Akiko Katsumi, Kobe (JP); Toshihiko Kiwa, Okayama (JP); Akihiro Izawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 60 days.

(21) Appl. No.: 18/290,313

(22) PCT Filed: May 18, 2021

(86) PCT No.: PCT/JP2021/018763
§ 371 (c)(1),
(2) Date: Nov. 13, 2023

(87) PCT Pub. No.: WO2022/244093
PCT Pub. Date: Nov. 24, 2022

(65) Prior Publication Data
US 2024/0268747 A1    Aug. 15, 2024

(51) Int. Cl.
*A61B 5/00*         (2006.01)
*A61B 5/0515*       (2021.01)

(52) U.S. Cl.
CPC .......... *A61B 5/4088* (2013.01); *A61B 5/0042* (2013.01); *A61B 5/0515* (2013.01)

(58) Field of Classification Search
CPC .... A61B 5/4088; A61B 5/0042; A61B 5/0515
See application file for complete search history.

(56) References Cited

U.S. PATENT DOCUMENTS

| 2006/0248944 A1 | 11/2006 | Gleich et al. |
| 2006/0248945 A1 | 11/2006 | Gleich |

(Continued)

FOREIGN PATENT DOCUMENTS

| EP | 2 401 033 B1 | 10/2013 |
| EP | 2 432 384 B1 | 7/2015 |

(Continued)

OTHER PUBLICATIONS

"Functionalized Magnetic Force Enhances Magnetic Nanoparticle Guidance . . ." by T.D. Do et al. IEEE Trans Magnetics. vol. 52, No. 7, Jul. 2016.*

(Continued)

*Primary Examiner* — Jason M Ip
(74) *Attorney, Agent, or Firm* — XSENSUS LLP (57) ABSTRACT

A biological information detection device includes an administration mechanism to administer magnetic particles into a brain, the magnetic particles being bound to a target inside the brain, a first varying magnetic field application mechanism to apply a first varying magnetic field to the magnetic particles from outside the brain, a magnetic signal detection mechanism to detect a magnetic signal generated by the magnetic particles bound to the target due to the first varying magnetic field, and a determiner to determine an amount of the target based on a strength of the magnetic signal.

16 Claims, 10 Drawing Sheets

(56) References Cited

U.S. PATENT DOCUMENTS

| | | | |
|---|---|---|---|
| 2007/0014730 | A1 | 1/2007 | Briel et al. |
| 2012/0119739 | A1 | 5/2012 | Gleich |
| 2013/0204120 | A1 | 8/2013 | Weinberg |
| 2014/0140932 | A1 | 5/2014 | Akhtari |
| 2023/0124954 | A1* | 4/2023 | Özarslan ............... G01R 33/58 324/309 |

FOREIGN PATENT DOCUMENTS

| | | |
|---|---|---|
| JP | H01-300942 A | 12/1989 |
| JP | H02-084933 A | 3/1990 |
| JP | 2006-523492 A | 10/2006 |
| JP | 2006-523496 A | 10/2006 |
| JP | 2009-056232 A | 3/2009 |
| JP | 2012-525193 A | 10/2012 |
| JP | 2017-086778 A | 5/2017 |
| JP | 2018-154646 A | 10/2018 |
| KR | 10-2020-0138980 A | 12/2020 |

OTHER PUBLICATIONS

"Quantifying the motion of magnetic particles in excised tissue: Effect of particle properties and applied magnetic field" by S. Kulkarni et al. J Magnetism Magnetic Materials. 393, p. 243-252, 2015.*

"Localization and Actuation for MNPs Based on Magnetic Field-Free Point . . . " by C. Kim et al. Micromachines. 11(11), 2020.*

Office Action issued Nov. 3, 2024 in Chinese Patent Application No. 202180098148.1, 16 pages.

International Search Report and Written Opinion mailed on Aug. 10, 2021, received for PCT Application PCT/JP2021/018763, filed on May 18, 2021, 11 pages including English Translation.

Notice of Reasons for Refusal mailed on Jul. 4, 2023, received for JP Application 2023-522037, 07 pages including English Translation.

Notice of Reasons for Refusal mailed on Oct. 3, 2023, received for JP Application 2023-522037, 05 pages including English Translation.

Office Action issued May 3, 2024 in German Patent Application No. 11 2021 007 259.5, 10 pages.

Office Action issued Jun. 13, 2024 in Chinese Patent Application No. 202180098148.1, 12 pages.

Office Action mailed Mar. 28, 2025 in corresponding Chinese patent application No. 202180098148.1 (18 pages; with English translation).

* cited by examiner

BIOLOGICAL INFORMATION DETECTION DEVICE AND BIOLOGICAL INFORMATION DETECTION METHOD

CROSS-REFERENCE TO RELATED APPLICATION

This application is based on PCT filing PCT/JP2021/018763, filed May 18, 2021, the entire contents of which are incorporated herein by reference.

TECHNICAL FIELD

The present disclosure relates to a biological information detection device and a biological information detection method.

BACKGROUND ART

Dementia patients are increasing every year. It is said that more than half of the dementia patients are suffering from Alzheimer's dementia. Known pathological changes that occur in the brain of an Alzheimer's dementia patient are accumulation of amyloid deposits. Thus, a device is required that detects an accumulation amount of amyloid deposits in the brain.

Amyloid positron emission tomography (PET) is known that uses a positron emission tomography scanner as the device that detects an accumulation amount of amyloid deposits in the brain. Amyloid PET, in which a radiopharmaceutical is used, however, needs designation of a controlled zone. For this reason, amyloid PET is not easy to handle and is used in limited medical institutions. The radiopharmaceutical has an extremely short expiry date of about a few hours, and thus, needs to be produced immediately before imaging. This leads to a need for installing a radiopharmaceutical production facility in the vicinity of a medical institution where imaging is performed. Also, when the radiopharmaceutical is no longer required due to a schedule change of a patient who is an imaging target, the radiopharmaceutical must be discarded.

As a method of acquiring biological information without a radiopharmaceutical, magnetic particle imaging (MPI) is known (e.g., see PTL 1).

The principle of MPI is briefly described as follows. When a varying magnetic field is applied to magnetic particles, the magnetic moment of the magnetic particles oscillates, generating a magnetic signal. Thus, detection of a magnetic signal generated upon external application of a varying magnetic field to magnetic particles can acquire locational information of the magnetic particles in a living body. In other words, imaging is enabled.

CITATION LIST

Patent Literature

PTL 1: Japanese Patent Laying-Open No. 2009-56232

SUMMARY OF INVENTION

Technical Problem

However, most of magnetic particle imaging methods of the prior arts including PTL 1 are targeted for diseases other than brain diseases. No techniques are known that can measure accumulation amounts of particular substances and tissues of the brain.

Magnetic particles have to be delivered into the brain in order to detect an accumulation amount of amyloid deposits in the brain using the magnetic particles. Although intravenous administration is known as a way of administering magnetic particles into a living body for delivery to the brain, the radiopharmaceutical needs to pass through a blood-brain barrier for delivery to the brain through a blood. The blood-brain barrier, which is formed by tight junction between endothelia cells, restricts exchange of substances between the blood and the brain. It is thus not easy to pass a drug, that is, magnetic particles, through the blood-brain barrier for delivery to the brain.

Therefore, an object of the present disclosure is to provide a biological information detection device and a biological information detection method that can detect an accumulation amount of a target in the brain.

Solution to Problem

A biological information detection device according to the present disclosure includes: an administration mechanism to administer magnetic particles into a brain, the magnetic particles being bound to a target inside the brain; a first varying magnetic field application mechanism to apply a first varying magnetic field to the magnetic particles from outside the brain; a magnetic signal detection mechanism to detect a magnetic signal generated by the magnetic particles bound to the target due to the first varying magnetic field; and a determiner to determine an amount of the target based on a strength of the magnetic signal.

A biological information detection method according to the present disclosure includes: administering, by an administration mechanism, magnetic particles into a brain, the magnetic particles being bound to a target inside the brain; applying, by a first varying magnetic field application mechanism, a first varying magnetic field to the magnetic particles from outside the brain; detecting, by a magnetic detection mechanism, a magnetic signal generated by the magnetic particles bound to the target due to the first varying magnetic field; and determining an amount of the target based on a strength of the magnetic signal.

Advantageous Effects of Invention

According to the present disclosure, an accumulation amount of a target in the brain can be detected by administering, by the administration mechanism, magnetic particles bound to the target in the brain into the brain.

DESCRIPTION OF EMBODIMENTS

Embodiments will describe a method and a device that can quantitatively measure amyloid deposits in the brain using functional magnetic particles that migrate to the brain and are specifically bound to the amyloid deposits. In particular, the embodiments will also describe a method of administering magnetic particles to the nasal cavity for delivery to the brain.

The inventors of the present application have found a phenomenon in which magnetic particles migrate to the brain via the nasal cavity and are bound to amyloid deposits. This is the first discovery in the world. The inventors of the present application have invented a method and a device that quantitatively measure amyloid deposits in the brain using such a phenomenon.

The method and the device of the embodiments can advantageously measure a total amount of amyloid deposits in the brain from outside a living body without damaging a living body, that is, with minimum invasiveness.

As described in BACKGROUND ART, an amyloid positron emission tomography (PET) is known in which a positron emission tomography scanner is used as a device that detects an accumulation amount of amyloid deposits in the brain. The amyloid PET, in which a radiopharmaceutical is used, however, suffers from various problems as described in BACKGROUND ART.

Under the circumstances, the inventors of the present application have come up with the concept of a device and a method for detecting an accumulation amount of amyloid deposits in the brain or other specific substances and tissues that are associated with neurodegenerative disorders, using magnetic particles with a long expiry date, rather than radiopharmaceuticals.

Magnetic particle imaging, which is known as a method of acquiring biological information using magnetic particles, fails to measure an amount of a target, such as amyloid deposits accumulated in the brain.

The embodiments below will describe examples in which amyloid deposits are used as a target in the brain to be detected, but the present disclosure is not limited thereto. The target in the brain may be tau protein, which is listed as one of the pathological changes in the Alzheimer's dementia, or other particular substances and tissues associated with neurodegenerative disorders.

The embodiments will now be described with reference to the drawings.

Embodiment 1

Figure 1:
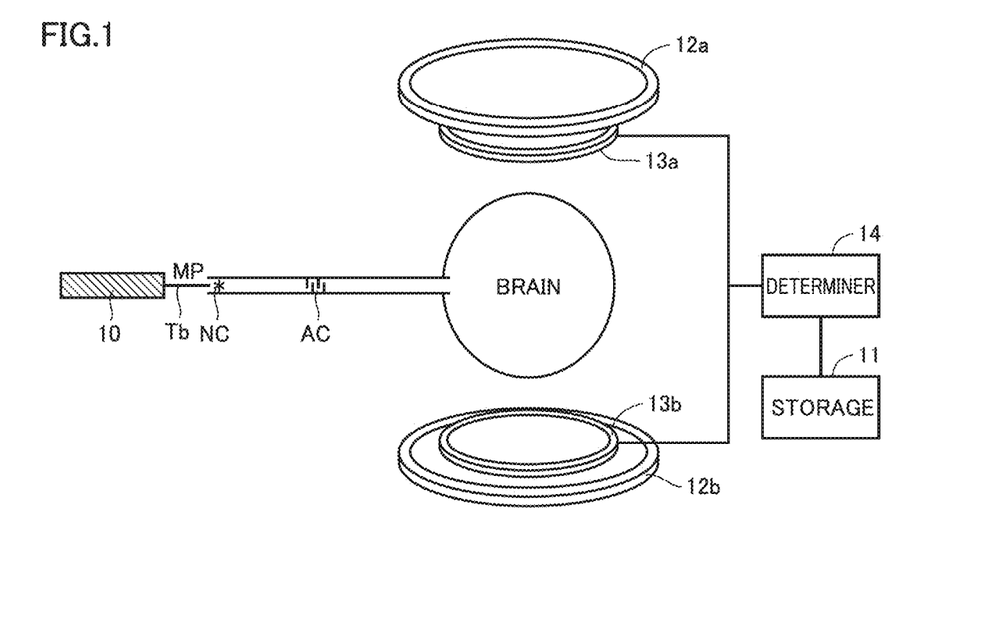
FIG. 1 shows a configuration of a biological information detection device of Embodiment 1.

FIG. 1 shows a configuration of a biological information detection device according to Embodiment 1.

The biological information detection device includes an administration mechanism 10, a first varying magnetic field mechanism 12a, 12b, a magnetic signal detection mechanism 13a, 13b, a storage 11, and a determiner 14.

Administration mechanism 10 administers functional magnetic particles (hereinafter, magnetic particles) MP, which are bound to amyloid deposits being a target in the brain, into the brain. Administration mechanism 10 administers magnetic particles MP into the brain via a nasal cavity NC.

First varying magnetic field mechanism 12a, 12b applies, from outside the brain, a first varying magnetic field MF1 to magnetic particles MP in the brain bound to the amyloid deposits.

Magnetic signal detection mechanism 13a, 13b detects a magnetic signal MS generated by magnetic particles MP bound to the amyloid deposits upon application of first varying magnetic field MF1.

Determiner 14 determines an amount of amyloid deposits based on magnetic signal MS.

Storage 11 stores information that specifies a correspondence between the strength of magnetic signal MS and the amount of amyloid deposits. The correspondence is a linear relationship between the strength of magnetic signal MS and the amount of amyloid deposits. This is because there is a linear relationship between the amount of amyloid deposits and the amount of magnetic particles MP bound to the amyloid deposits, and also, there is a linear relationship between the amount of magnetic particles MP and the strength of magnetic signal MS.

With reference to information stored in storage 11, determiner 14 determines an amount of amyloid deposits that corresponds to the strength of magnetic signal MS detected by magnetic signal detection mechanism 13a, 13b.

Figure 2:
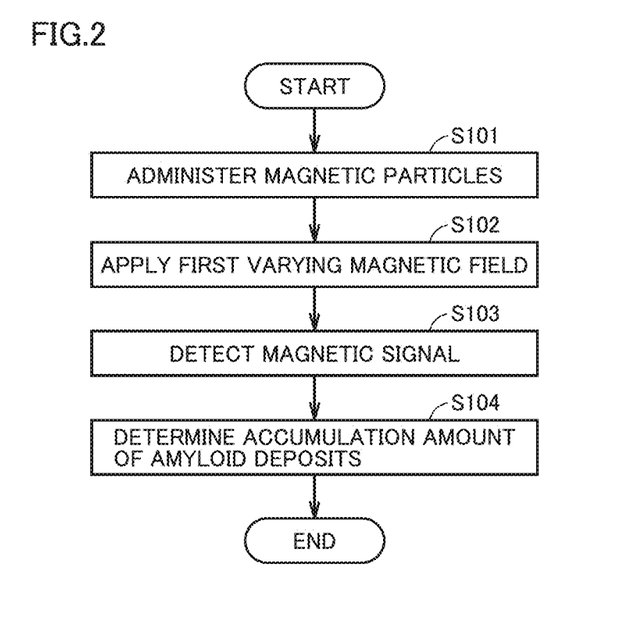
FIG. 2 is a flowchart showing a procedure of detecting an accumulation amount of amyloid deposits in the brain by the biological information detection device of Embodiment 1.

FIG. 2 is a flowchart showing a procedure of detecting an accumulation amount of amyloid deposits in the brain by the biological information detection device of Embodiment 1.

In step S101, magnetic particles MP are administered to nasal cavity NC by administration mechanism 10. Administration mechanism 10 has a function of causing magnetic particles MP to reach the nasal mucosa. For example, administration mechanism 10 has an elongated tube Tb, which extends from the vicinity of the entrance of nasal cavity NC to the vicinity of the nasal mucosa, and through which magnetic particles MP pass. Magnetic particles MP that have reached the nasal mucosa in nasal cavity NC pass through a tight junction AC located between the nasal mucosa and the brain. Magnetic particles MP after passing through tight junction AC spread throughout the brain through, for example, a cerebrospinal fluid or the like, to be delivered to the brain parenchyma or the like in which amyloid deposits are formed. Some of magnetic particles MP are specifically bound to the amyloid deposits. Magnetic particles MP that have not been bound to the amyloid deposits are released from the brain.

Although the present embodiment describes a method of administering magnetic particles MP to nasal cavity NC for delivery of magnetic particles MP to the brain, any method is applicable as long as it delivers magnetic particles MP through tight junction AC to the brain. For example, magnetic particles MP may be administered to a vein to pass through the blood-brain barrier.

In step S102, first varying magnetic field MF1 is applied to magnetic particles MP within the brain from outside the brain by first varying magnetic field mechanism 12a, 12b. If first varying magnetic field MF1 is applied too early, a sufficient amount of magnetic particles MP have not been bound to amyloid deposits or magnetic particles MP that have not been bound to amyloid deposits still remain inside the brain, and thus, an amount of amyloid deposits cannot be detected correctly. In contrast, if first varying magnetic field MF1 is applied too late, magnetic particles MP that have been bound to amyloid deposits become dissociated from the amyloid deposits to be released from the brain. It is thus preferable that first varying magnetic field MF1 be applied at an optimum timing at which a sufficient amount of magnetic particles MP have been bound to the amyloid deposits and magnetic particles MP that have not been bound to the amyloid deposits are sufficiently released from the brain. A higher frequency of first varying magnetic field MF1 results in a higher strength of magnetic signal MS generated from magnetic particles MP. As the frequency of first varying magnetic field MF1 is higher, however, a living body may be more likely to be affected. It is thus preferable that an optimum value be selected for a frequency f1 of first varying magnetic field MF1. For example, frequency f1 of first varying magnetic field MF1 preferably falls within the range of approximately several hundreds of hertz to several tens of kilohertz. Upon application of first varying magnetic field MF1, magnetic particles MP generate magnetic signal MS.

In step S103, magnetic signal MS is detected by magnetic signal detection mechanism 13a, 13b. For example, magnetic signal detection mechanism 13a, 13b employs a receiver coil system that converts temporal changes in magnetic flux penetrating a coil into an electromotive force. Alternatively, magnetic signal detection mechanism 13a, 13b may be a magnetic sensor such as a magnetic impedance sensor, a tunnel magnetoresistance (TMR) sensor using a tunnel magnetoresistance effect, an optically pumped magnetic sensor, or a superconducting quantum interference device (SQUID).

In step S104, with reference to the information stored in storage 11, determiner 14 determines an amount of amyloid deposits that corresponds to the strength of magnetic signal MS detected by magnetic signal detection mechanism 13a, 13b.

The above process uses no radiopharmaceutical, and accordingly, has no half-life period. The present embodiment implements a device that detects an accumulation amount of amyloid deposits in the brain using magnetic particles with a long expiry date.

Figure 3:
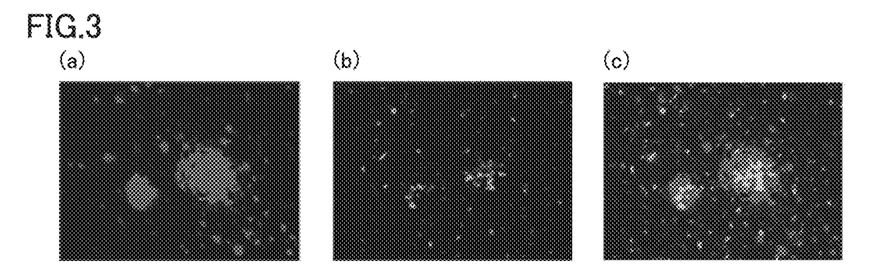
FIG. 3 shows images for describing example experimental results by the biological information detection device of Embodiment 1.
Figure 4:
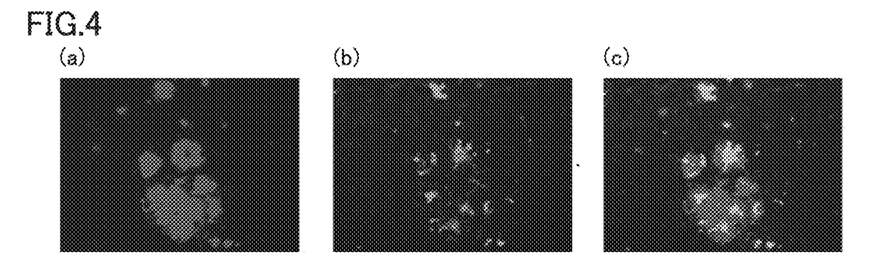
FIG. 4 shows images for describing example experimental results by the biological information detection device of Embodiment 1.
Figure 5:
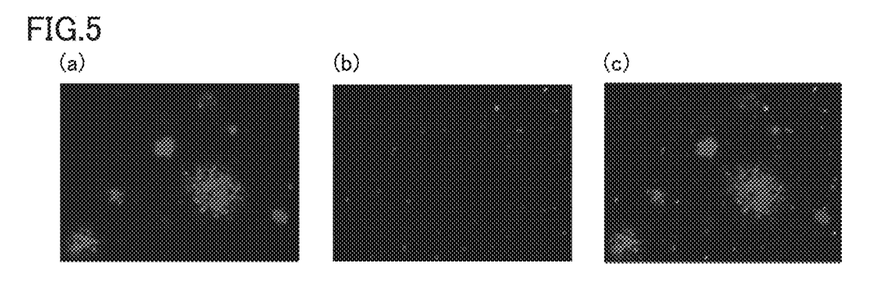
FIG. 5 shows images for describing example experimental results by the biological information detection device of Embodiment 1.

FIGS. 3 to 5 show images for describing example experimental results by the biological information detection device of Embodiment 1.

The experimental method will be described. Functional magnetic particles bound to amyloid deposits and mainly containing an iron oxide were administered into nasal cavity NC of an 18-month-old individual of APP 23, one of transgenic mice in which amyloid deposits were expressed, using administration mechanism 10. Functional magnetic particles MP (20 µl) containing 3.6 mg of iron per milliliter were administered.

Six hours after the administration of magnetic particles MP, perfusion fixation was conducted, and the brain was removed. After preparation of brain sections, the binding between the magnetic particles and the amyloid deposits was verified. An anti-polyethylene glycol (PEG) antibody and an anti-amyloid-ß antibody (anti-Aβ antibody) were used. Magnetic particles were detected by detecting the PEG on surfaces of the magnetic particles using the anti-PEG antibody (anti-PEG staining), and amyloid deposits were detected using the anti-Aβ antibody (anti-Aβ staining). The binding between the magnetic particles and the amyloid deposits was investigated by superimposing an image showing the locations of magnetic particles MP detected by anti-PEG staining and an image showing the locations of the amyloid deposits detected by anti-Aβ staining.

FIG. 3 shows results on one individual of APP 23.

FIG. 3(a) shows an image after anti-Aβ staining. The locations of the amyloid deposits identified by anti-Aβ staining are lightly colored compared with the other locations.

FIG. 3(b) shows an image after anti-PEG staining. The locations of the magnetic particles investigated by anti-PEG staining are lightly colored compared with the other locations.

FIG. 3(c) shows an image obtained by synthesizing the image of FIG. 3(a) and the image of FIG. 3(b).

It can be found that the locations of the amyloid deposits investigated by anti-Aβ staining overlap the locations of magnetic particles MP investigated by anti-PEG staining. In other words, it is expected that magnetic particles MP will have been bound to the amyloid deposits.

FIG. 4 shows results on another individual of APP 23.

FIG. 4(a) shows an image after anti-Aβ staining. The locations of the amyloid deposits investigated by anti-Aβ staining are lightly colored compared with the other locations.

FIG. 4(b) shows an image after anti-PEG staining. The locations of the magnetic particles investigated by anti-PEG staining are lightly colored compared with the other locations.

FIG. 4(c) shows an image obtained by synthesizing the image of FIG. 4(a) and the image of FIG. 4(b).

It can be found that the locations of the amyloid deposits investigated by anti-Aβ staining overlap the locations of magnetic particles MP investigated by anti-PEG staining. In other words, it is expected that magnetic particles MP will have been bound to the amyloid deposits.

FIG. 5 shows results when magnetic particles MP were not administered to APP 23. When magnetic particles MP are not administered, the locations of magnetic particles MP are not detected by anti-PEG staining. In this case, thus, magnetic particles MP are not bound to amyloid deposits.

Figure 6:
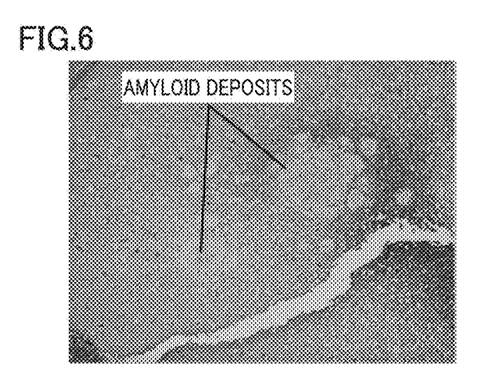
FIG. 6 shows images for describing another example experimental result by the biological information detection device of Embodiment 1.
Figure 7:
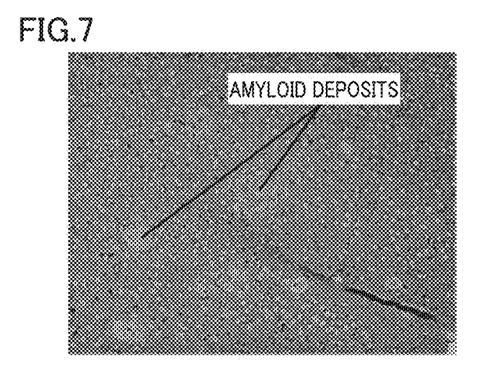
FIG. 7 shows images for describing another example experimental result by the biological information detection device of Embodiment 1.
Figure 8:
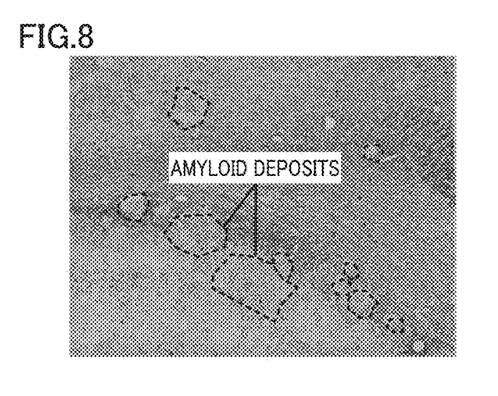
FIG. 8 shows images for describing another example experimental result by the biological information detection device of Embodiment 1.

Each of FIGS. 6 to 8 shows an image for describing another example experimental result by the biological information detection device of Embodiment 1.

The experimental method will be described. Functional magnetic particles bound to amyloid deposits and mainly containing an iron oxide were administered to an 18-month-old individual of APP 23, one of transgenic mice in which amyloid deposits were expressed, via nasal cavity NC using administration mechanism 10. Functional magnetic particles MP (20 µl) containing 3.6 mg of iron per milliliter were administered. Six hours after the administration of magnetic particles MP, perfusion fixation was conducted, and the brain was removed. After preparation of brain sections, the locations of magnetic particles MP were verified by Berlin blue staining. In Berlin blue staining, iron, which is a main component of magnetic particles MP, is dyed blue. Although the blue color is not shown in FIGS. 6 to 8, the locations dyed blue by Berlin blue staining are lightly colored compared with its surroundings.

FIG. 6 shows a result on one individual of APP 23. The locations of amyloid deposits are lightly colored compared with its surroundings. In other words, these locations are locations dyed blue by Berlin blue staining, which verify the presence of iron. It is thus expected that magnetic particles MP will be bound to the amyloid deposits.

FIG. 7 shows a result on another individual of APP 23. The locations of amyloid deposits are lightly colored compared with its surroundings. This result also confirms the presence of iron, that is, the presence of magnetic particles, which is investigated by Berlin blue staining, in the locations of amyloid deposits.

FIG. 8 shows a result when magnetic particles MP are not administered to APP 23 for comparison. When magnetic particles MP are not administered, the presence of magnetic particles MP is not investigated in the locations of amyloid deposits. In FIG. 8, representative locations of amyloid deposits are surrounded by the black dotted lines. No magnetic particles MP are present in these locations. In this case, thus, magnetic particles MP are not bound to the amyloid deposits.

The results of FIGS. 3 to 8 show that when being administered into nasal cavity NC through administration mechanism 10, functional magnetic particles MP migrate to the brain and are bound to amyloid deposits in the brain.

Embodiment 2

Figure 9:
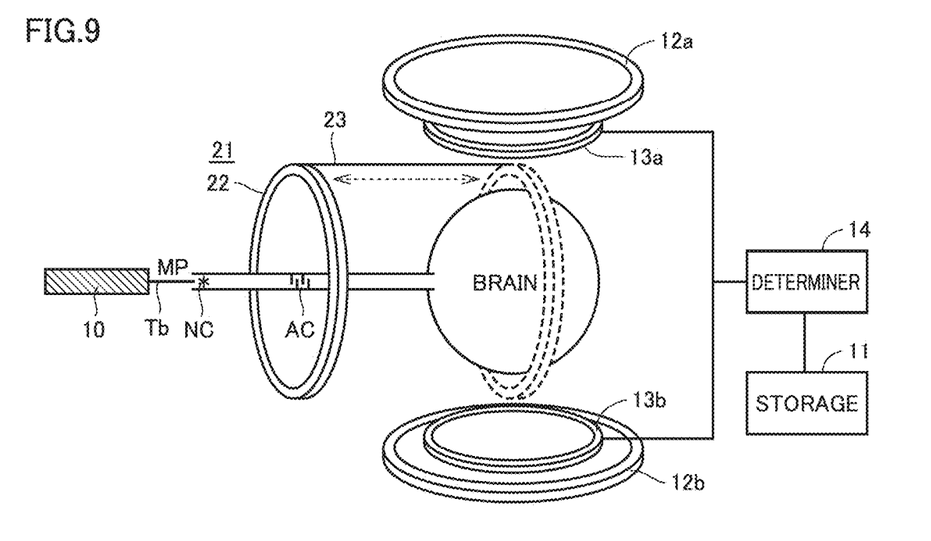
FIG. 9 shows a configuration of a biological information detection device of Embodiment 2.

FIG. 9 shows a configuration of a biological information detection device of Embodiment 2.

The biological information detection device of Embodiment 2 is different from the biological information detection device of Embodiment 1 in that the biological information detection device of Embodiment 2 includes a second varying magnetic field application mechanism 21.

Second varying magnetic field application mechanism 21 applies a second varying magnetic field MF2 that has a time-varying strength. Second varying magnetic field application mechanism 21 applies second varying magnetic field MF2 to magnetic particles MP before the application of first varying magnetic field MF1. Second varying magnetic field application mechanism 21 facilitates migration of magnetic particles MP to the brain.

Second varying magnetic field application mechanism 21 applies second varying magnetic field MF2 toward tight junction AC. This improves the ratio at which magnetic particles MP pass through tight junction AC, that is, improves delivery of magnetic particles MP to the brain. Second varying magnetic field application mechanism 21 is preferably movable. The magnetic force of second varying magnetic field MF2 can control movement of magnetic particles MP that have passed through tight junction AC. This is because magnetic particles MP, which have magnetism, tend to be attracted toward a strong magnetic force. As second varying magnetic field application mechanism 21 moves, the magnetic force of second varying magnetic field MF2 moves. As a result, magnetic particles MP can be guided to the entire brain.

Figure 10:
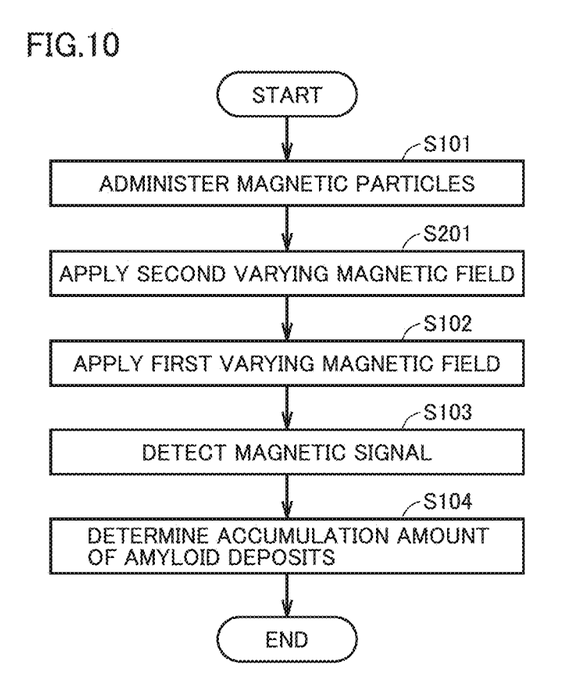
FIG. 10 is a flowchart showing a procedure of detecting an accumulation amount of amyloid deposits in the brain by the biological information detection device of Embodiment 2.

FIG. 10 is a flowchart showing a procedure of detecting an accumulation amount of amyloid deposits in the brain by the biological information detection device of Embodiment 2.

This flowchart is different from the flowchart of Embodiment 1 shown in FIG. 2 in the following point. This flowchart includes step S201 between step S101 and step S102.

In step S201, second varying magnetic field application mechanism 21 applies second varying magnetic field MF2 to magnetic particles MP, before the application of first varying magnetic field MF1.

Figure 11:
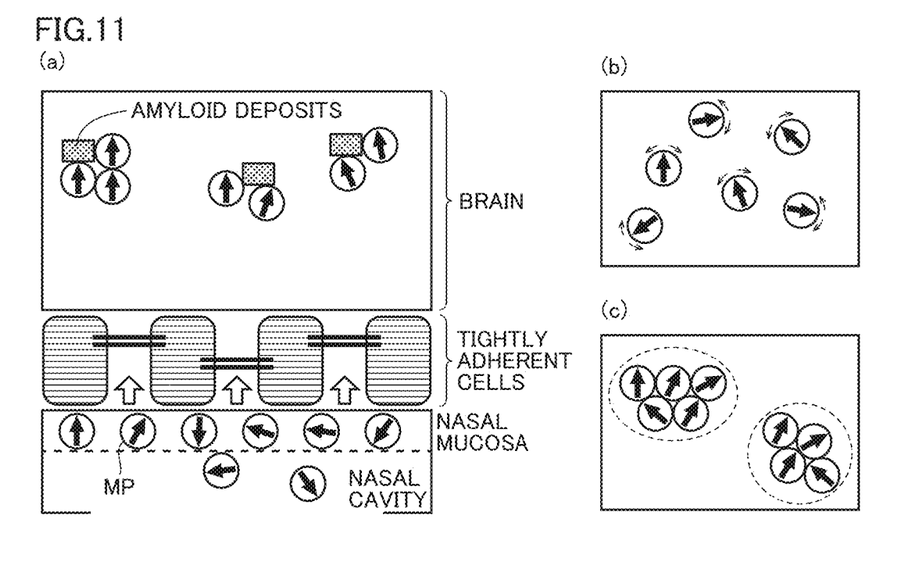
FIG. 11 shows, in Part (a), migration of magnetic particles MP to the brain, in Part (b), magnetic particles MP when a second varying magnetic field MF2 is applied, and in Part (c), magnetic particles MP when second varying magnetic field MF2 is not applied.

Next, the reason why the delivery of magnetic particles MP to the brain is facilitated by second varying magnetic field MF2 will be described. FIG. 11(a) shows migration of magnetic particles MP to the brain.

In general, magnetic particles MP tend to aggregate owing to the intermolecular and magnetic forces acting between magnetic particles MP and other magnetic particles MP. When magnetic particles MP aggregate, magnetic particles MP have an increased effective diameter, and less easily pass through tight junction AC. When it is difficult for magnetic particles MP to pass through tight junction AC, the delivery of magnetic particles MP to the brain is hindered. In order to suppress aggregation of magnetic particles MP, second varying magnetic field MF2 is applied to magnetic particles MP using second varying magnetic field application mechanism 21. When Brownian relaxation becomes dominant for the response of magnetic moment of magnetic particles MP to the varying magnetic field, magnetic particles MP vibrate themselves according to second varying magnetic field MF2. As magnetic particles MP vibrate themselves, the aggregation of magnetic particles MP is suppressed. This makes it easy for magnetic particles MP to pass through tight junction AC, leading to an improved rate of delivery of magnetic particles MP to the brain. FIG. 11(b) shows magnetic particles MP when second varying magnetic field MF2 is applied. FIG. 11(c) shows magnetic particles MP when second varying magnetic field MF2 is not applied.

It is preferable that frequency f2 of second varying magnetic field MF2 should not be too high. If frequency f2 of second varying magnetic field MF2 is too high, Brownian relaxation does not become dominant but Neel relaxation becomes dominant for a response to the varying magnetic field of the magnetic moment of magnetic particles MP. When Neel relaxation becomes dominant, magnetic particles MP do not vibrate themselves with respect to a varying magnetic field, and only the magnetic moment of magnetic particles MP oscillates. Suppression of aggregation of magnetic particles MP is not expected at frequency f2 at which Neel relaxation becomes dominant.

In contrast, when frequency f1 of first varying magnetic field MF1 for oscillating the magnetic moment of magnetic particles MP to generate magnetic signal MS is high, the strength of magnetic signal MS increases. Thus, it is preferable that first varying magnetic field MF1 have higher frequency f1. As described above, frequency f2 of second varying magnetic field MF2 is preferably lower than frequency f1 of first varying magnetic field MF1.

Figure 12:
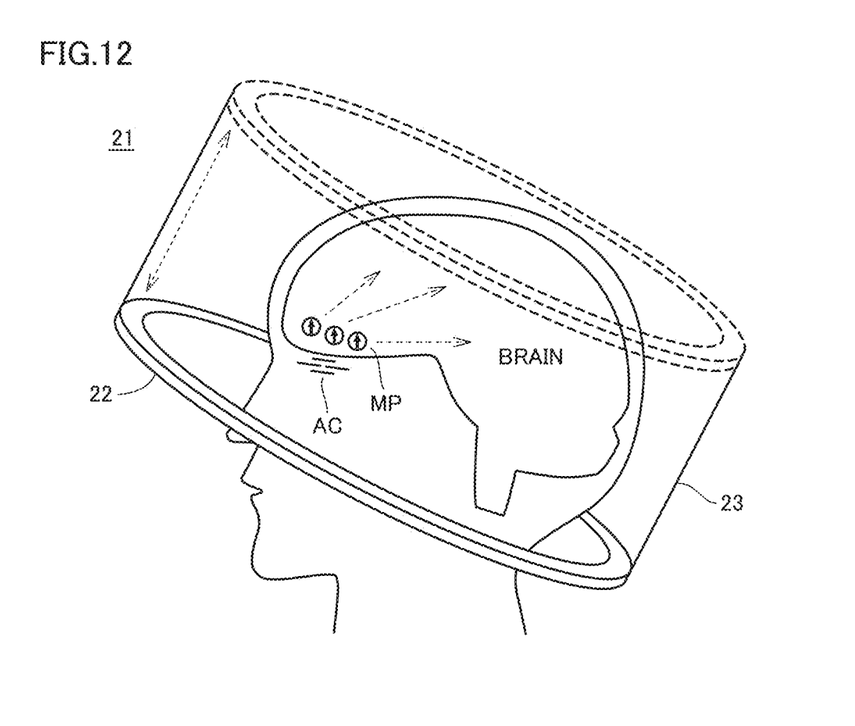
FIG. 12 shows an example moving mode of a second varying magnetic field application mechanism 21 in Embodiment 2.

FIG. 12 shows an example moving mode of second varying magnetic field application mechanism 21 in Embodiment 2. In this mode, second varying magnetic field application mechanism 21 is translated so as to surround the entire head.

Second varying magnetic field application mechanism 21 includes a second varying magnetic field generator 22 and a movable guide 23. Second varying magnetic field generator 22 has a ring shape. Second varying magnetic field generator 22 generates second varying magnetic field MF2. Movable guide 23 is arranged in a direction parallel to the central axis of the ring, that is, a direction perpendicular to a surface of the ring. Along movable guide 23, second varying magnetic field generator 22 can move in the direction parallel to the central axis of the ring.

Variation of Embodiment 2

Figure 13:
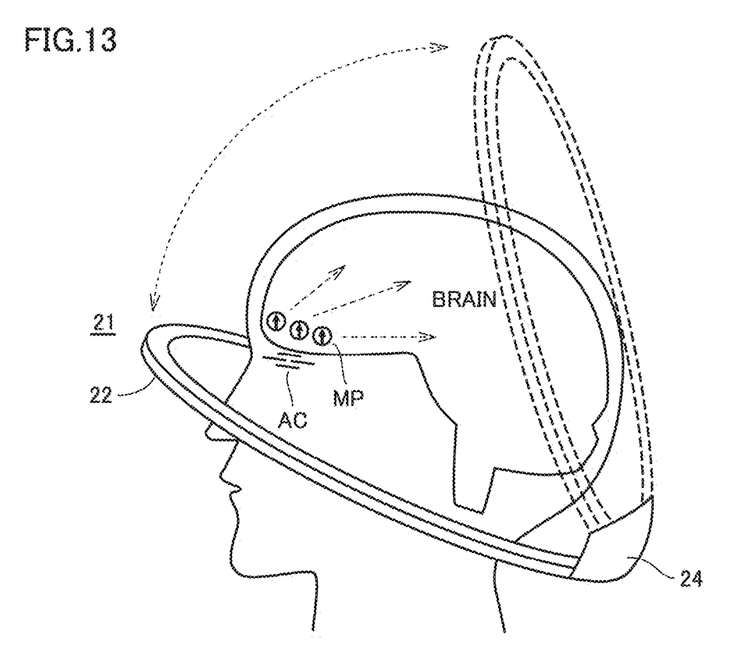
FIG. 13 shows an example moving mode of second varying magnetic field application mechanism 21 in a variation of Embodiment 2.

FIG. 13 shows an example moving mode of second varying magnetic field application mechanism 21 in a variation of Embodiment 2. Second varying magnetic field application mechanism 21 includes second varying magnetic field generator 22 and a movable support 24.

Second varying magnetic field generator 22 has a ring shape. Second varying magnetic field generator 22 generates second varying magnetic field MF2. Movable support 24 is coupled to one part of the ring. Second varying magnetic field generator 22 of ring shape is configured to be rotatable with movable support 24 as a fulcrum. The moving mode of second varying magnetic field application mechanism 21 is not limited to the moving modes shown in FIGS. 11 and 12. Each of the moving modes of FIGS. 11 and 12 has a configuration in which second varying magnetic field application mechanism 21 surrounds the entire head, but the present application is not limited thereto.

The moving mode of second varying magnetic field application mechanism 21 may be any moving mode as long as it can control movement of magnetic particles MP that have passed through tight junction AC by the magnetic force of second varying magnetic field MF2, thereby delivering magnetic particles MP to the entire brain. The moving modes of FIGS. 11 and 12 are targeted for the human head.

Similarly in another part of the human or another animal, the moving mode of second varying magnetic field application mechanism 21 is not limited to the moving modes of FIGS. 11 and 12 as long as it can control the movement of magnetic particles MP by the magnetic force of second varying magnetic field MF2, thereby delivering magnetic particles MP to the entire brain.

Embodiment 3

Figure 14:
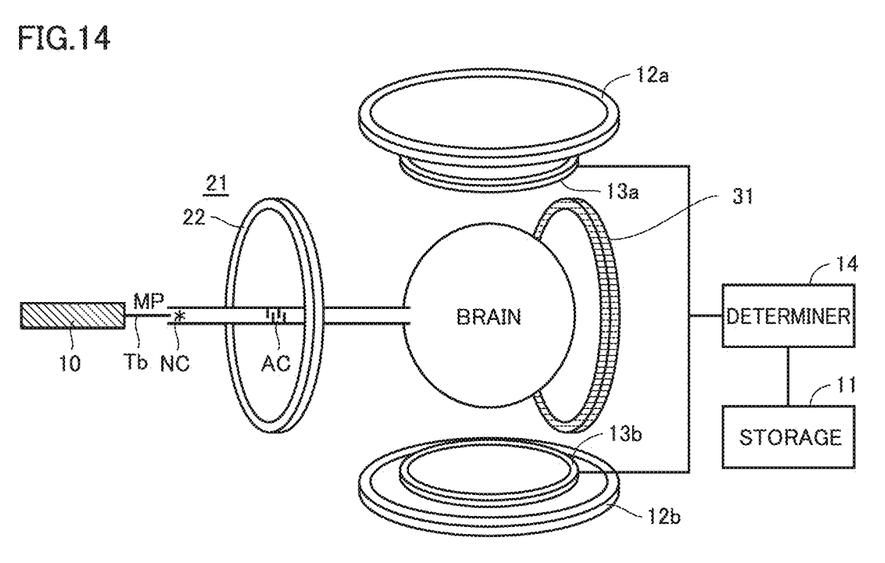
FIG. 14 shows a configuration of a biological information detection device of Embodiment 3.

FIG. 14 shows a configuration of a biological information detection device of Embodiment 3.

The biological information detection device of Embodiment 3 is different from the biological information detection device of Embodiment 2 in that the biological information detection device of Embodiment 3 includes a diffusion magnetic field application mechanism 31.

Diffusion magnetic field application mechanism 31 delivers magnetic particles MP to the entire brain. After the administration of magnetic particles MP into a living body, diffusion magnetic field application mechanism 31 applies a diffusion magnetic field DF for delivery, that is, diffusion of magnetic particles MP to the entire brain. Diffusion magnetic field application mechanism 31 applies, to magnetic particles MP, diffusion magnetic field DF for diffusing magnetic particles MP into the brain, before the application of first varying magnetic field MF1.

Diffusion magnetic field application mechanism 31 may be movable or non-movable.

In the case of movable diffusion magnetic field application mechanism 31, diffusion magnetic field application mechanism 31 has a moving mode similar to that of second varying magnetic field application mechanism 21 shown in FIG. 12 or 13. In the case of movable diffusion magnetic field application mechanism 31, second varying magnetic field application mechanism 21 does not need to be necessarily movable.

In contrast, in the case of non-movable, that is, fixed diffusion magnetic field application mechanism 31, diffusion magnetic field application mechanism 31 is preferably arranged opposite to tight junction AC with respect to the brain as shown in FIG. 14. In the case of non-movable diffusion magnetic field application mechanism 31, second varying magnetic field application mechanism 21 also does not need to be necessarily movable.

Diffusion magnetic field DF may be a magnetic field that changes temporally or a magnetic field that does not change temporally as long as it can diffuse magnetic particles MP to the entire brain using a magnetic force. Although it is normally assumed that diffusion magnetic field DF is applied at a timing after magnetic particles MP have passed through tight junction AC, such a timing may not necessarily be after magnetic particles MP have passed through tight junction AC. When diffusion magnetic field DF is applied immediately after the administration of magnetic particles MP to a living body by administration mechanism 10, such application is expected to be effective to improve the rate of migration of magnetic particles MP to the brain.

Figure 15:
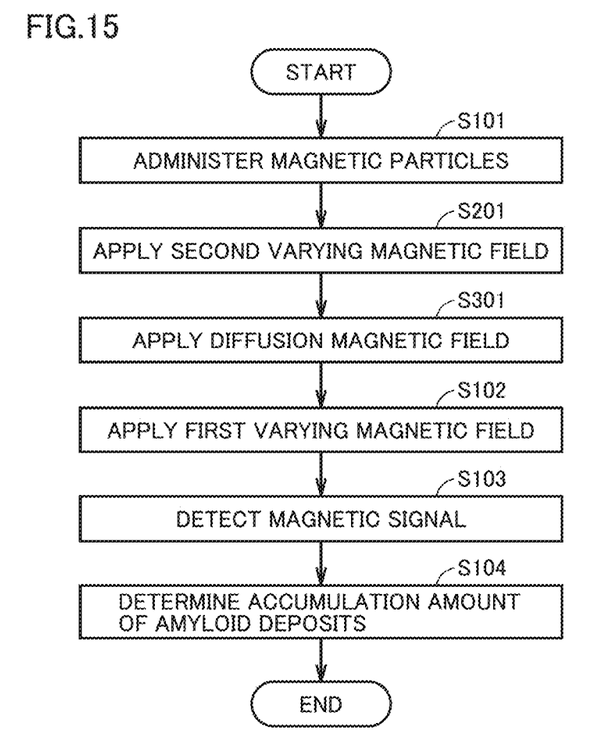
FIG. 15 is a flowchart showing a procedure of detecting an accumulation amount of amyloid deposits in the brain by the biological information detection device of Embodiment 3.

FIG. 15 is a flowchart showing a procedure of detecting an accumulation amount of amyloid deposits in the brain by the biological information detection device of Embodiment 3.

This flowchart is different from the flowchart of Embodiment 2 shown in FIG. 2 in the following point. This flowchart includes step S301 between step S201 and step S102.

In step S301, diffusion magnetic field application mechanism 31 applies diffusion magnetic field DF to magnetic particles MP before the application of first varying magnetic field MF1 in step S102.

Figure 16:
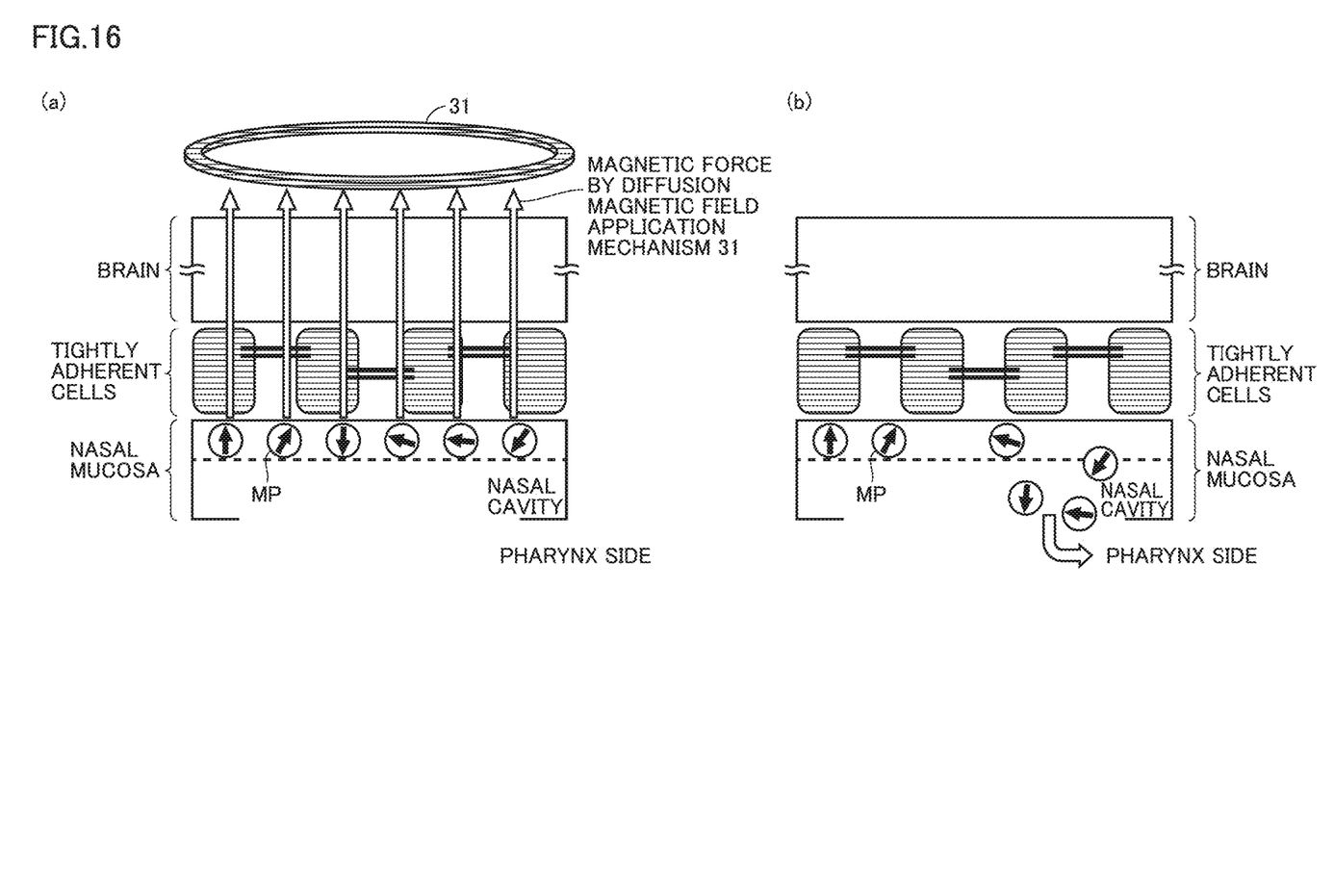
FIG. 16 shows, in Part (a), magnetic particles MP when a diffusion magnetic field DF is applied by a diffusion magnetic field application mechanism 31, and in Part (b), magnetic particles MP when diffusion magnetic field DF is not applied by diffusion magnetic field application mechanism 31.

The reason why the rate of migration of magnetic particles MP to the brain is improved by diffusion magnetic field application mechanism 31 will be described.

FIG. 16(a) shows magnetic particles MP when diffusion magnetic field DF is applied by diffusion magnetic field application mechanism 31. FIG. 16(b) shows magnetic particles MP when diffusion magnetic field DF is not applied by diffusion magnetic field application mechanism 31.

In general, magnetic particles MP that have been administered into the nasal cavity and reached the nasal mucosa tend to flow out of the nasal cavity on the pharynx side after a certain period of time. As diffusion magnetic field application mechanism 31 is arranged on the opposite side of the brain with respect to the nasal mucosa, the magnetic force of diffusion magnetic field DF can keep magnetic particles MP in the nasal mucosa. In other words, the magnetic force of diffusion magnetic field DF by diffusion magnetic field application mechanism 31 keeps magnetic particles MP in the nasal mucosa for a longer period of time. As magnetic particles MP remain in the nasal mucosa for a longer period of time, the ratio at which magnetic particles MP pass through tight junction AC increases.

Although the biological information detection device includes second varying magnetic field application mechanism 21 and diffusion magnetic field application mechanism 31 in the above embodiment, it may not include second varying magnetic field application mechanism 21.

Embodiment 4

Figure 17:
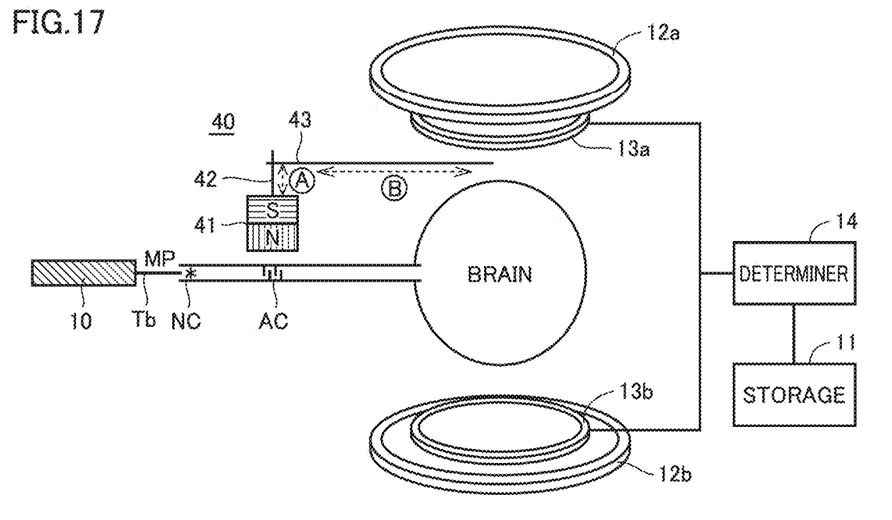
FIG. 17 shows a configuration of a biological information detection device according to Embodiment 4.

FIG. 17 shows a configuration of a biological information detection device of Embodiment 4.

The biological information detection device of Embodiment 4 is different from the biological information detection device of Embodiment 2 in that the biological information detection device of Embodiment 4 includes a second varying magnetic field application mechanism 40 that is different from the second varying magnetic field application mechanism of Embodiment 2.

Second varying magnetic field application mechanism 40 incudes a permanent magnet 41, a support 42, and a movable guide 43.

In the vicinity of tight junction AC, an oscillating magnetic field is generated by vibrating permanent magnet 41. The varying magnetic field by permanent magnet 41 induces vibrations of magnetic particles MP, thus suppressing aggregation of magnetic particles MP. As a result, the ratio at which magnetic particles MP pass through tight junction AC and the rate of migration to the brain are improved.

Preferably, permanent magnet 41 is vibrated in a direction A as shown in FIG. 17. Direction A is a direction from the south pole to the north pole of permanent magnet 41 and is also a direction from permanent magnet 41 to tight junction AC. The south pole and the north pole in FIG. 17 may be reversed vertically.

Along movable guide 43, permanent magnet 41 is translated in a direction B shown in FIG. 17. Direction B is perpendicular to the direction (direction A) of the vibration of permanent magnet 41. As permanent magnet 41 moves, magnetic particles MP can be delivered to the entire brain.

Variation of Embodiment 4

Figure 18:
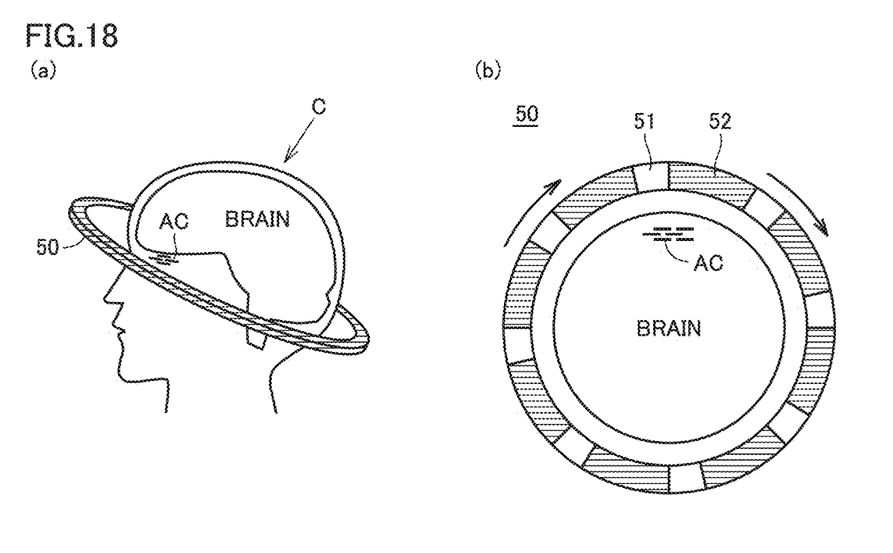
FIG. 18 shows, in Part (a), a second varying magnetic field application mechanism 50 of a variation of Embodiment 4, and in Part (b), second varying magnetic field application mechanism 50 as viewed from a direction C of Part (a).

FIG. 18(a) shows a second varying magnetic field application mechanism 50 of a variation of Embodiment 4. FIG. 18(b) shows second varying magnetic field application mechanism 50 as viewed from a direction C in FIG. 18(a).

Second varying magnetic field application mechanism 50 has a ring shape. Second varying magnetic field application mechanism 50 generates second varying magnetic field MF2. The ring has permanent magnets 51 of identical size and non-magnetic materials 52 of identical size alternately arranged. The ring is configured to be rotatable. As second varying magnetic field application mechanism 50 is rotated about the axis in direction C, second varying magnetic field MF2 is applied to the vicinity of tight junction AC. Frequency f2 of second varying magnetic field MF2 can be adjusted according to the rotation speed of the ring and the spacing between permanent magnets 51.

Second varying magnetic field application mechanism 50 of the present embodiment may have a moving mode as shown in FIG. 12 or 13.

The equivalent operations of determiner 14 and storage 11 in Embodiments 1 to 4 may be configured using digital circuit hardware or software.

Figure 19:
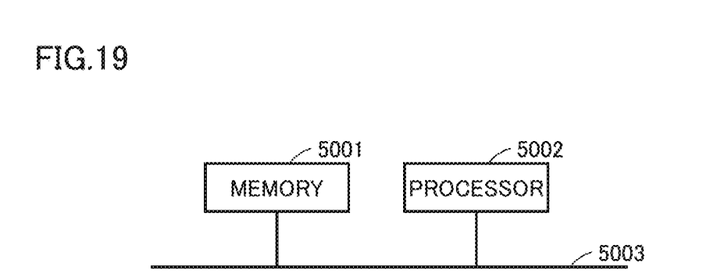
FIG. 19 shows a configuration when functions of a determiner 14 and a storage 11 are implemented using software.

FIG. 19 shows a configuration when the functions of determiner 14 and storage 11 are implemented using software. Determiner 14 and storage 11 include a processor 5002 and a memory 5001, respectively, connected to a bus 5003. Processor 5002 executes a program stored in memory 5001.

It should be understood that the embodiments disclosed herein have been presented for the purpose of illustration and non-restrictive in every respect. It is therefore intended that the scope of the present disclosure is defined by claims, not only by the embodiments described above, and encompasses all modifications and variations equivalent in meaning and scope to the claims.

REFERENCE SIGNS LIST 10 administration mechanism; 11 storage; 12a, 12b first varying magnetic field mechanism; 13a, 13b magnetic signal detection mechanism; 14 determiner; 21, 40, 50 second varying magnetic field application mechanism; 22 second varying magnetic field generator; 23, 43 movable guide; 24 movable support; 31 diffusion magnetic field application mechanism; 41, 51 permanent magnet; 42 support; 52 non-magnetic material; 5001 memory; 5002 processor; 5003 bus; AC tight junction; MP magnetic particle; NC nasal cavity.

The invention claimed is:

1. A biological information detection device comprising:
an administration mechanism including an elongated tube to administer magnetic particles into a brain, the magnetic particles being bound to a target inside the brain;
a varying magnetic field generator to apply a varying magnetic field to the magnetic particles before application of an other varying magnetic field;
an other varying magnetic field generator, different from the varying magnetic field generator, to apply the other varying magnetic field to the magnetic particles from outside the brain, the other varying magnetic field being different from the varying magnetic field;
a magnetic signal detector to detect a magnetic signal generated by the magnetic particles bound to the target due to the other varying magnetic field;
determination circuitry configured to determine an amount of the target based on a strength of the magnetic signal; and
a diffusion magnetic field generator to apply, to the magnetic particles, a diffusion magnetic field for diffusing the magnetic particles into the brain, after the application of the varying magnetic field and before the application of the other varying magnetic field.

2. The biological information detection device according to claim 1, further comprising:
a storage to store information that specifies a correspondence between the strength of the magnetic signal and the amount of the target,
wherein with reference to the information stored in the storage, the determination circuitry determines the amount of the target corresponding to the strength of the magnetic signal by the magnetic signal detector.

3. The biological information detection device according to claim 2, wherein:
the correspondence is a linear relationship between the strength of the magnetic signal and the amount of the target.

4. The biological information detection device according to claim 1, wherein:
the administration mechanism administers the magnetic particles into the brain via a nasal cavity.

5. The biological information detection device according to claim 1, wherein:
the varying magnetic field generator applies the varying magnetic field toward a tight junction.

6. The biological information detection device according to claim 1, wherein:
the varying magnetic field generator is movable.

7. A biological information detection device comprising:
an administration mechanism including an elongated tube to administer magnetic particles into a brain, the magnetic particles being bound to a target inside the brain;
a varying magnetic field generator to apply a varying magnetic field to the magnetic particles before application of an other varying magnetic field,
an other varying magnetic field generator, different from the varying magnetic field generator, to apply the other varying magnetic field to the magnetic field particles from outside the brain, the other varying magnetic field being different from the varying magnetic field;
a magnetic signal detector to detect a magnetic signal generated by the magnetic particles bound to the target due to the other varying magnetic field;
a determination circuitry configured to determine an amount of the target based on a strength of the magnetic signal; and
wherein;
the varying magnetic field generator is movable,
wherein the varying magnetic field generator includes:
a ring magnetic field generator in a shape of a ring to generate the varying magnetic field, and
a movable guide to move the ring magnetic field generator in a direction parallel to a central axis of the ring.

8. The biological information detection device according to claim 6, wherein:
the first varying magnetic field generator includes:
a ring magnetic field generator in a shape of a ring to generate the first varying magnetic field, and
a movable support coupled to one part of the ring, and the ring is rotatable with the one part as a fulcrum.

9. The biological information detection device according to claim 1, wherein:
a frequency of the varying magnetic field is lower than a frequency of the other varying magnetic field.

10. The biological information detection device according to claim 6, wherein:
the varying magnetic field generator includes a permanent magnet which vibrates.

11. The biological information detection device according to claim 10, wherein:
the varying magnetic field generator includes a movable guide for moving the permanent magnet in a direction perpendicular to a direction of vibration.

12. The biological information detection device according to claim 6, wherein
the varying magnetic field generator include a ring magnetic field generator in a shape of a ring to generate the varying magnetic field, and
the ring has a plurality of permanent magnets of identical size and a plurality of non-magnetic materials of identical size arranged alternately, and the ring is rotatable.

13. The biological information detection device according to claim 1, wherein the diffusion field generator is movable.

14. The biological information detection device according to claim 1, wherein the diffusion magnetic field generator is fixed and is arranged opposite to a tight junction with respect to the brain.

15. The biological information detection device according to claim 1, wherein:
the target is an amyloid deposit.

16. A biological information detection method comprising:
administering magnetic particles into a brain, the magnetic particles being bound to a target inside the brain;
applying a varying magnetic field, using a varying magnetic field generator, to the magnetic particles before application of an other varying magnetic field; and
applying the other varying magnetic field, using another varying magnetic field generator different from the magnetic field generator, to the magnetic particles from outside the brain, the other varying magnetic field being different from the first varying magnetic field;
detecting a magnetic signal strength generated by the magnetic particles bound to the target due to the other varying magnetic field; and
determining an amount of the target based on a strength of the magnetic signal;
applying a diffusion field for diffusing the magnetic particles into the brain, after the application of the varying magnetic field and before the application of the other varying magnetic field.

* * * * *